Patented Sept. 15, 1942

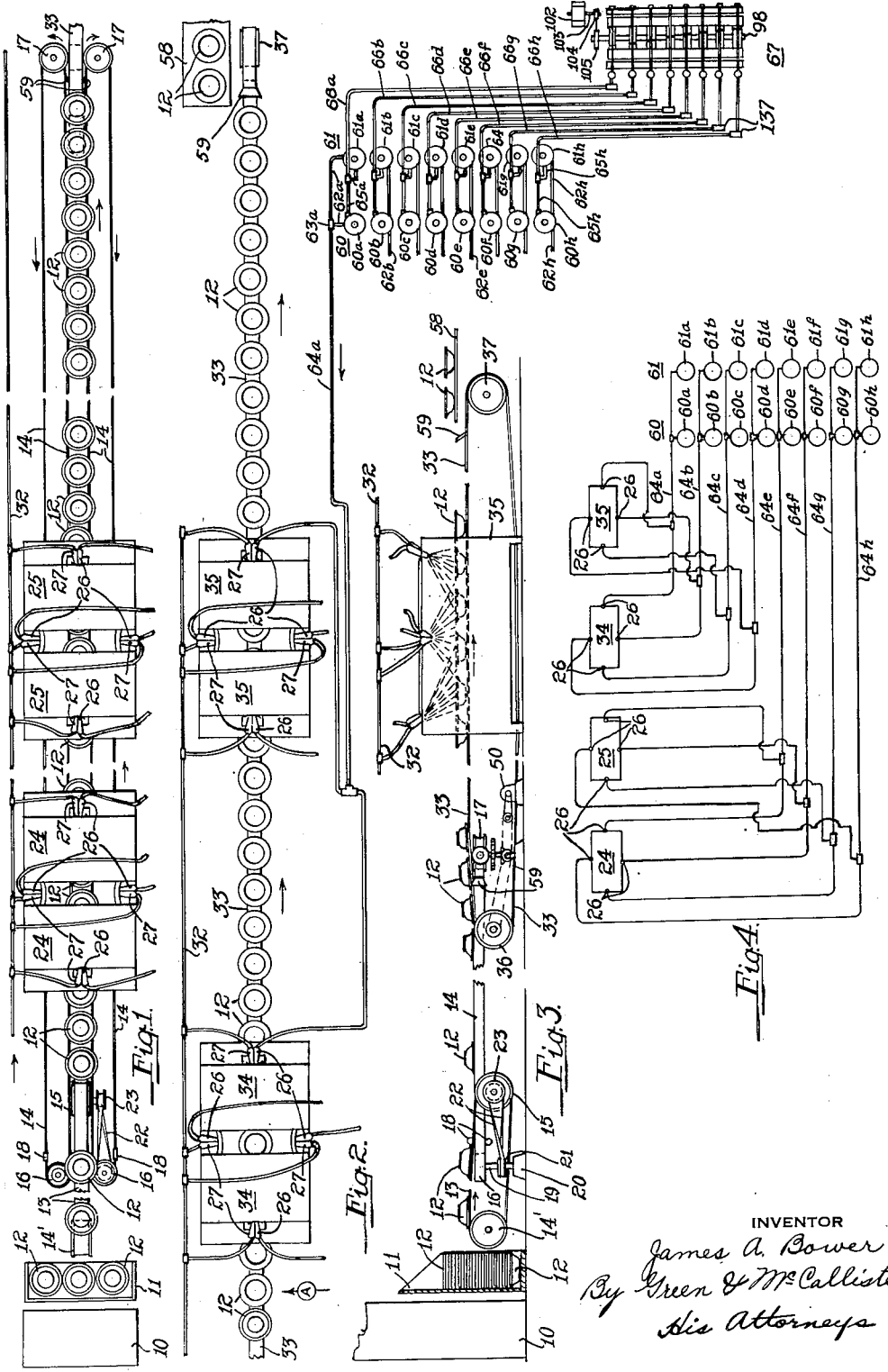

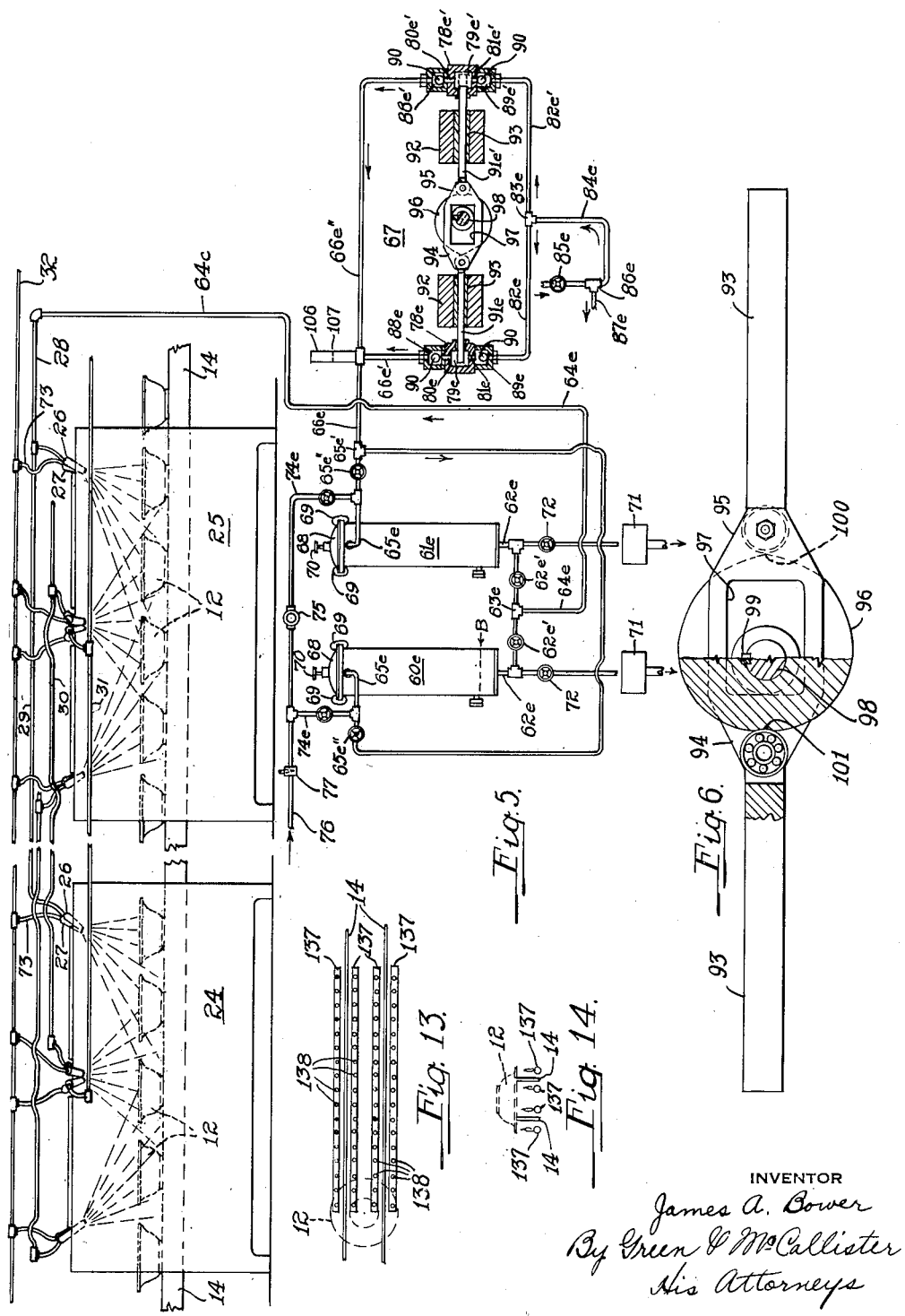

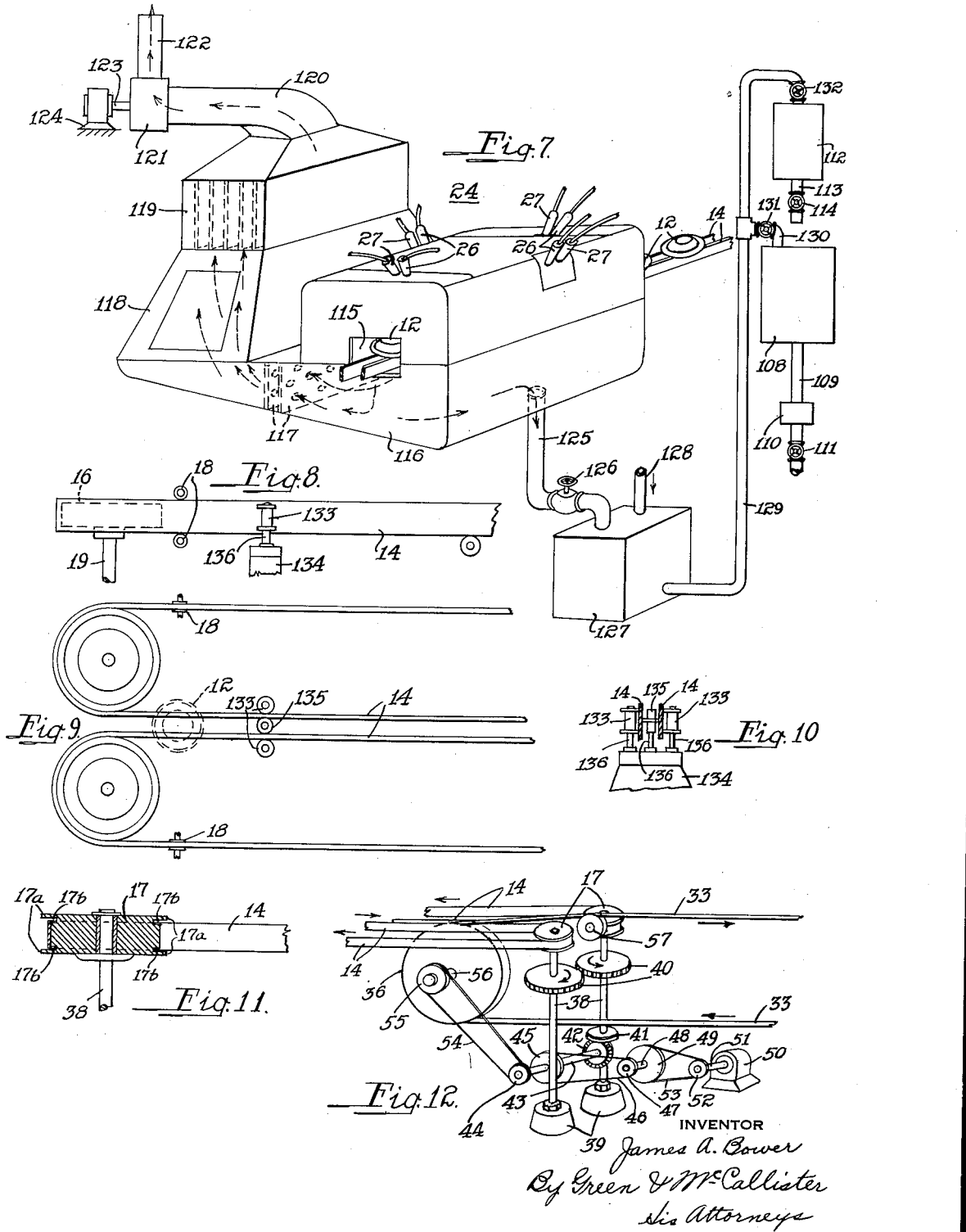

2,295,928

UNITED STATES PATENT OFFICE 2,295,928

METHOD AND APPARATUS FOR GLAZING CERAMIC WARE

James A. Bower, Chester, W. Va., assignor to The Taylor, Smith & Taylor Company, a corporation of West Virginia Application April 29, 1938, Serial No. 205,020

12 Claims. (Cl. 117—104)

My present invention relates to the glazing of ceramic ware and more particularly to a new and useful method and apparatus for effecting the same.

It has been the custom in the pottery trade for many years to glaze ceramic ware by hand dipping and by semi-mechanical handling but modern conditions of mass production and the necessity for producing ware at low cost has made it necessary to devise more efficient and more economical ways to glaze such ware. There have been certain recognized defects and disadvantages in connection with prior procedures and equipment which have been deemed unavoidable but which result in a relatively large proportion of imperfect or poorly finished pieces of ware as well as uneconomical use of the glazing materials themselves. For example, it has been difficult to secure a uniform glaze upon ceramic ware with the result that in the past much ware has been produced which is non-uniform and sub-standard. Again prior procedures and equipment have involved considerable manual handling of the ware and/or the use of ware handling devices which have fallen short of producing the desired results. Insofar as the manual handling is concerned, this not only increases the cost of the ware but is likely to produce irregularities in the glazed surfaces. Insofar as prior handling devices are concerned, these have resulted in an undue waste of glaze material or in the production of ware having spots or areas deficient in glaze, thus again producing imperfect articles. One of the most serious difficulties has resulted from the inability to feed glaze to the ware at a constant rate with the result that the ware receives more glaze on some areas than on others and in some cases surfaces of the ware have received inadequate amounts of glaze or no glaze at all. This has been due in part to the fact that glaze has heretofore been fed to a plurality of spray nozzles from a common source and through a common line. When a spray nozzle becomes partially or fully clogged the ware, therefore, receives less than the predetermined amount of glaze at corresponding points. While many efforts have been made in the past to overcome some or all of the above difficulties, these efforts have either been failures or have produced only partial results. As a consequence the industry has not been able to advance to the desired state of efficiency.

It is, accordingly, one of the objects of my present invention to provide both a procedure and an apparatus by means of which the above defects and disadvantages can be obviated.

It is another object of my invention to glaze ceramic ware by a new procedure which not only insures the production of few or no seconds or sub-standard pieces but which also enables ware to be produced which has new and superior characteristics.

Another object of the invention is to produce apparatus which shall not only eliminate many of the manual operations required in the past but which shall automatically and reliably insure the application of a predetermined constant amount of glaze to every unit of ware surface.

More specifically, an object of this invention resides in the provision of a procedure whereby ceramic ware, such as dinnerware, can be handled rapidly and expeditiously and glazed with a high degree of efficiency at a low cost.

A still further object of the invention resides in preheating the ware before applying glaze thereto and then in applying the glaze in such manner that a predetermined constant amount of glaze is received by each unit of surface area of the ware, regardless of whether or not certain of the spray nozzles become partially or entirely clogged.

A still further object of the invention resides in the provision of apparatus or equipment wherein the foregoing and other objects and advantages can be readily achieved in a positive controllable manner free from mechanical or procedural difficulties.

A still further object of the invention resides in feeding a constant volume or amount of liquid glaze to the spraying nozzles by a liquid displacement system.

A still further object of the invention resides in optionally applying heat to ceramic ware between glazing operations thereon and during conveying of the ware through a system of booths.

Other and further objects and advantages reside in the various combinations, sub-combinations and elements both of method and of apparatus which shall be hereinafter set forth as well as in objects and advantages which will be understood by those skilled in this art or apparent from the present description.

In the accompanying drawings, wherein like numerals designate corresponding parts throughout the various views:

Figure 1 is a plan view of a portion of the equipment or apparatus embodying the present invention with parts omitted for convenience of illustration;

Figure 2 is a continuation of Fig. 1 and is a plan view of the balance of the equipment herein involved;

Fig. 3 is a side elevational view of portions of the equipment shown in Figs. 1 and 2;

Fig. 4 is a schematic view illustrating the manner of connecting the glaze feeding tanks with the spray nozzles, which connections are partially indicated in Figs. 1 and 2;

Fig. 5 is a side elevational view partly in section illustrating structurally one of the schematic units of Fig. 4;

Fig. 6 is an enlarged side elevational view partly in section of one cam and piston unit of the pump illustrated in Fig. 2;

Fig. 7 is a perspective view partly diagrammatic of a spray booth with operatively associated parts shown in connection therewith;

Fig. 8 is a side elevational view of a detail of the conveyor system embodied in the present invention;

Fig. 9 is a plan view of Fig. 8;

Fig. 10 is a detail view illustrating the manner of controlling the vertical belts forming a part of the conveyor system and taken at right angles to Figs. 8 and 9;

Fig. 11 is a sectional view partly in elevation of a recessed pulley for conveyor belt guiding and glaze collecting purposes;

Fig. 12 is a perspective view of the driving unit for the entire conveyor system;

Fig. 13 is a fragmentary plan view of the means for applying heat to the ware while it is traveling on vertical belts forming a part of the conveyor system; and Fig. 14 is an elevational view of the parts of Fig. 13.

Referring to the drawings, the numeral 10 indicates a storage chamber or compartment wherein the formed but unglazed ceramic ware is preheated prior to the application of glaze thereto. The exact form, size or material of this compartment or chamber is immaterial but it should preferably be of sufficient size to accommodate a considerable supply of unglazed ware and may be provided with a plurality of shelves upon which ware can be stacked or piled. For convenience and economy, this chamber or compartment may be made of wood and is provided with a connection at its top or other suitable location to a supply of waste heat of sufficient volume and temperature to enable the ware to be maintained in chamber or compartment 10 at a temperature in the neighborhood of 190° F.

A relatively small supply of unglazed ware is removed from chamber or compartment 10 and piled in bin 11, the ware being shown therein at 12 as being formed into a few small piles or stacks. The ware in bin 11 is rapidly utilized and hence does not lose much of its heat, particularly because ware by its very nature is a poor conductor of heat. To retard loss of heat a cover of cloth or sacking is preferably placed over the ware.

The ware is then fed onto the flat feeding belt 13 while it is still at a temperature of approximately 190° F. or slightly therebelow. This flat feeding belt 13 is relatively short and passes over the pulleys 14' and 15. The ware is fed by hand a single piece at a time onto said feeding belt closely spaced and in inverted position as shown best in Fig. 3. The feeding belt 13 is driven by the driving unit to be hereinafter described at a speed of approximately 45 linear feet per minute. Belt 13 is composed of rubber or other relatively soft material and forms a suitable surface for receiving the preheated ware without liability of chipping, cracking, or otherwise damaging the same. It is to be understood that belt 13 may travel at any desired speed between about 25 and 75 linear feet per minute depending on the characteristics of the particular glaze being applied and that all conveyor belts of the present conveyor system travel at the same speed as belt 13.

From the flat feeding belt 13 the ware passes without manual aid to the two endless vertical conveying belts 14. These are made of spring steel $\frac{1}{32}$ of an inch in thickness and 3 inches in width and support the ware with a very small contact between the belts and the ware and thus minimize glaze irregularities resulting from previous arrangements wherein the feeding belts contact with a relatively large ware area. The two vertical belts 14 are each driven by the driving unit to be described and each such belt passes around a pair of horizontal pulleys 16 and 17, of which pulleys 16 are smooth-surfaced and of slightly less vertical height than the belts themselves, i. e., the faces of pulleys 16 are less than 3 inches in vertical extent. These belts 14 are maintained in proper association with the plane pulleys 16 by the provision of guide rolls 18 positioned above and below each such belt 14 in contact therewith. Each plane faced pulley 16 is mounted on a vertical shaft 19 which is supported at its lower end in bearing 20. Intermediate its ends the shaft 19 is provided with a pulley or sprocket 21 around which an endless chain or belt 22 is passed in such manner as to make a quarter turn (see Fig. 3), this being known in the art as a quarter-turn belt. The quarter-turn chain or belt 22 also passes around a sprocket or pulley 23 mounted on or connected to and turning with pulley 15 of the flat feeding belt 13, this arrangement acting to drive the flat feeding belt from and at the same speed as the vertical belts 14, as will be understood.

These vertical belts 14 pass through two similar spray booths 24 and 25 in each of which four atomizing spray nozzles 26 are angularly mounted. These spray nozzles 26 are so mounted (see Fig. 7) that one nozzle is located at each end and at each side of each booth 24 and 25 and all are preferably mounted at an angle of approximately 45 degrees to the horizontal. The spray guns or nozzles 26 are also so disposed in each booth that they are equidistant from the ware surfaces to which they supply glaze during the actual spraying operations thus ensuring complete and uniform glazing operations. To adjust the nozzles to this condition for different sizes and shapes of ware provision is made (not shown) for bodily moving the guns or nozzles inwardly or outwardly without changing their angular inclination. In special cases the angular inclination may also be somewhat varied again dependent on ware characteristics. Each such spray nozzle 26 is supplied with glaze, as will be hereinafter more fully explained, and each such nozzle is likewise provided with an atomizing part 27 which is supplied with air at suitable pressure and volume. The glaze supply lines for nozzles 26 are indicated at 28, 29, 30, 31 and the air supply line at 32. The ware, as it passes through the two booths 24 and 25, receives a predetermined constant amount of liquid glaze on its bottom surfaces in such manner that the amount of glaze is equal and uniform for every unit of surface area. The means and procedure for accomplishing this will be explained hereinafter. It will be noted that corresponding nozzles 26 in these two booths have a common supply line for liquid glaze and that each supply line is distinct and separate from every other supply line; in other words, a number of supply lines is provided which is equal to one-half the number of spray nozzles and these supply lines are so connected to the nozzles that each line supplies the two nozzles which project glaze upon the same surface of the ware. Thus it will be understood that for any given pair of nozzles if one becomes partially or entirely clogged the same amount of glaze will nevertheless be delivered to the ware surface because the deficiency will be made up by the other nozzle. For example, if one nozzle becomes 50 per cent clogged the other nozzle will deliver 150 per cent of glaze to the ware surface in question and if one nozzle becomes entirely clogged the other nozzle will deliver 200 per cent of its normal supply capacity to the ware surface so that regardless of the condition of the nozzles the predetermined constant amount of liquid glaze will always be supplied to every unit of ware surface.

It will be observed that the booths 24 and 25 are somewhat spaced from each other (see Fig. 1) and this arrangement is for the purpose of effecting a certain amount of evaporation and absorption between the first booth and the second booth. This is made possible due to the fact that the ware still contains a large percentage of the heat which was imparted to it during the preheating operation. In fact, observations of ware passing between booths 24 and 25 show the rising of steam or vapors from the ware and partial drying of the glaze at this stage can be observed by the loss of a liquid or wet appearance.

The ware emerges from booth 25 still on the vertical belts 14 and with a uniform amount of glaze on the exposed surfaces thereof. Further evaporation and absorption occurs between the time that the ware emerges from the second booth 25 and the time it is turned over so that the other side may be sprayed. This turning, while accomplished by hand, may be accomplished mechanically or automatically, although I have found that the latter is not ordinarily necessary. This turning takes place at approximately the point indicated by the arrow A in Fig. 2, after the ware has traveled for a further distance on the vertical belts 14, and after it has traveled for a distance on the subsequent endless flat belt 33 on which it travels through the next two spaced booths 34 and 35. A short distance back of the pulleys 17 a relatively large vertical pulley or wheel 36 is provided around which the flat belt 33 passes. Another or similar pulley 37 is provided as shown for the flat belt 33 at the discharge end of the conveyor system.

The single driving unit for all the belts referred to will be best understood from Fig. 12. In this figure the right-hand ends of the vertical belts 14 are shown as passing around the horizontal pulleys 17, each of which is mounted on the upper end of a vertical shaft 38. The lower end of each such shaft is mounted in a suitable support or bearing 39. Each shaft is also provided intermediate its ends with a spur gear 40 which is keyed or otherwise suitably secured to its shaft 38. Gears 40 rotate in the directions shown by the arrows thereon. One shaft 38 has a bevel gear 41 secured thereon and this bevel gear meshes with a bevel gear 42 which is mounted on one end of a transverse shaft 43, on the other end of which is a sprocket or pulley 44. Intermediate bevel gear 42 and sprocket or pulley 44 is another sprocket or pulley 45 around which passes a chain or belt 46, which also passes around a small sprocket or pulley 47 mounted on a short transverse shaft 48 and on which shaft is provided a relatively large pulley or sprocket 49. A suitable motor of desired characteristics is provided as shown at 50 and the shaft 51 of which has on the end thereof a sprocket or pulley 52. The chain or belt 53 passes around the large pulley 49 and the motor pulley 52. Sprocket or pulley 44 on the transverse shaft 43 has a chain or belt 54 passing therearound, which also passes around the sprocket or pulley 55 on the short transverse shaft 56 upon which the large wheel or pulley 36, already referred to, is also mounted and over which flat belt 33 travels in the direction shown by the arrows, there being a supporting idler or tension roll 57 provided underneath the same so that as flat belt 33 leaves the upper surface of large wheel 36 it travels at an upward inclination which, as will be apparent from the mid-portion of Fig. 3, acts to transfer the ware 12 from the vertical belts 14 to the flat belt 33.

The ware 12 travels along the flat belt 33 above referred to, is uprighted just before it passes into booth 34 and then passes through the spray booth 34 which is spaced considerably away from booth 25. As the ware passes through this booth 34 the upper surfaces of the ware have applied thereto a predetermined constant amount of liquid glaze in the same manner as has already been described in connection with the operation of glazing in the first two booths. After the ware leaves the booth 34 it travels for a short distance further and then enters the fourth and final booth 35 in which the spraying of the ware is completed. Each of these latter two booths is provided with four spray guns or nozzles 26 each disposed at an angle of approximately 45° to the horizontal and equidistant from the ware surfaces and provided with atomizers 27 all as above described in connection with the first two booths. With respect to booths 34 and 35, like booths 24 and 25, the connections are such with the source of glaze that the pipe connections are one-half as numerous as the glaze nozzles and corresponding nozzles in the booths are connected to a common pipe so that at all times during operation the predetermined amount of glaze is applied to every unit of area of the ware even if either of the nozzles should become partially or entirely clogged. After the ware leaves the fourth and last booth it travels for a further distance in order to effect drying and is then manually removed from the flat belt 33 at the discharge end thereof, and is then suitably stacked as on a support 58 or otherwise handled for subsequent treatment such as baking operations, the application of surface designs, and other finishing operations. It will further be noted from Figs. 1 to 3 in particular that wipers 59 are provided in connection with both the vertical belts 14 and the flat belt 33 so as to remove from such belts glaze which accumulates thereon, thus not only preventing interference with the proper operation of said belts but also serving to save glaze which would otherwise be wasted. These wipers may be of any desired form but preferably consist of squeegees made of rubber and suitably pressed into wiping contact with the belts at an angle thereto as indicated on the drawings. I find it is desirable to place a suitable container or receptacle (not shown) beneath the wipers so as to catch the removed glaze.

The means for feeding liquid glaze from the spray nozzles to the ware at a predetermined constant rate by liquid displacement as above referred to forms an important part of my present invention. This arrangement will be clearly understood, it is believed, from Figs. 4 and 5, in particular, taken in conjunction with the right hand portion of Fig. 2. From these figures it will be apparent that the glaze feeding tanks as referred to above are arranged in two batteries 60 and 61 of eight tanks each (60a—h and 61a—h), making a total of sixteen tanks. These feeding tanks are so arranged that one tank of each battery 60 is connected to the corresponding tank of the other battery 61 to form eight pairs of interconnected tanks, such as 60e—61e, Fig. 5, each of which will hereinafter be referred to as one tank or feeding unit. Thus it will be understood that there are eight such feeding units and that these eight feeding units supply the eight pairs of spray nozzles located in the booths.

Discharge pipes 62a—h lead from the bottom of each pair of feeding tanks and are interconnected as by a T 63a (Fig. 2) for tanks 60a—61a to form a common feed line 64a. Each tank is provided near its upper end with a glaze inlet line 65a—h connected into a common supply line 66a—h, the other end of each of which is connected to one pumping unit of the constant displacement pump 67 hereinafter to be described in detail.

The arrangement whereby these eight tank units supply the sixteen nozzles in the four booths in such manner that each tank unit supplies two correspondingly located nozzles which project glaze upon the same ware surface, is clearly indicated in Fig. 4. Referring, for example, to the uppermost tank unit 60a—61a in Fig. 4, the feeding line 64a supplies the two nozzles 26 which are in corresponding positions in booths 34 and 35. Similarly, lowermost tank unit 60h—61h supplies liquid glaze through the feed line 64h to the two nozzles 26 correspondingly located in the booths 24 and 25. The other tank units supply the other pairs of correspondingly disposed nozzles as will be clear from the connections shown and the numerals utilized.

Referring particularly to Fig. 5, there is therein shown one complete unit. This unit comprises a tank unit composed of the tanks 60e and 61e. These tanks are cylindrical and open at their upper ends. The upper end of each such tank is closed by a dome-shaped cover 68 which is adapted to be clamped on the tank by means of the clamps 69 in the manner of a pressure cooker lid. Centrally disposed of each such cover 68 is a valve or pet-cock 70, the purpose of which will be explained. From the bottom of each tank a feed line 62e extends which is adapted to discharge into the containers 71 diagrammatically shown therebelow for the purpose of recovering a certain fraction of the glaze as will be hereinafter explained. Each such pipe 62e is provided with a valve 72 which is normally closed. Each such pipe 62e is also provided with a branch line which, via T-connections, leads to feeding line 64e which supplies corresponding spray nozzles 26 in booths 24 and 25. Each such branch line is provided with a valve 62e' which is manipu-lated as will be hereinafter set forth. These nozzles 26 referred to have aspirating parts 27 as above explained through which air is fed under suitable pressure through the connections 73 from the air supply line 32.

The inlet lines 65e are connected into each tank near the upper end thereof as shown best in Fig. 5. These lines join, at the T 65e', the common supply line 66e made up of lines 66e' and 66e" leading from the constant displacement pump 67. A valve 65e" is located in each inlet line and, between such valve and the adjacent tank, a T is provided in each line which connects via valved line 74e to a common header 75 for all tanks and which header carries water. A pipe 76 connecting with a source of water supply such as the city water is shown which is provided with a needle valve indicated diagrammatically at 77 and which is normally adjusted so as to provide water through header 75 and thence through inlet lines 65e at a low pressure such that at the stage when water is admitted to the tanks from the city water, see post, there will be no mixing of the water with the glaze already in the tanks.

As already mentioned, the constant displacement pump 67 is composed of a number of identical units (eight) equal in number to the tank units (eight) and each such pump unit supplies water to each such tank unit. Each pump unit includes two blocks or castings 78e and 78e' each having an internal chamber 79e and 79e'. Passageways or outlets 80e and 80e' lead up from said chambers 79e, 79e' to the pump discharge lines 66e' and 66e", respectively. Likewise, passageways or inlets 81e and 81e' lead downwardly from chambers 79e and 79e' to the pump inlet lines 82e, 82e' which, by means of a T 83e, are connected to a common pump water supply line 84e which is adapted to receive water from a suitable source and which is provided with a valve 85e. Between the valve 85e and the T 83e a second T 86e is provided to which is connected a pipe 87e for draining and/or flushing purposes. The outlet passageways referred to effect communication between chambers 79e, 79e' and valve or ball chambers 88e, 88e'. The inlet passageways referred to effect communication between chambers 79e, 79e' and valve or ball chambers 89e, 89e'. In each such valve or ball chamber is a valve element such as a steel ball 90.

Projecting into the chambers 79e, 79e' in the castings or blocks 78e, 78e' are the piston rods 91e, 91e' supported and guided in and by the bearings 92 having bushings or linings 93. The piston rods 93 are connected at their outer ends to the cam plates 94, 95 which overlap the cam 96 on opposite sides thereof. The cam plates are cut out to form therein the rectangular openings 97. A cam shaft 98 passes through the cam and the remaining pump units and is suitably keyed at 99. The cam shaft 98 is eccentrically disposed with respect to the cam 96 which has a convex or generally circular profile such that it tapers to a point 100 on one side and has a depression 101 at the opposite side. The piston rods are connected to the cam plates as shown or in any other suitable manner. Followers are provided as indicated for the usual purpose.

The cam shaft 98 is driven from a motor 102, the shaft 103 of which is provided at its end with a pulley 104, and which pulley drives a pulley 105 on the end of the cam shaft by means of a suitable belt, chain, or the like passing therearound. It may be noted at this point that the pump is of such nature that, contrary to the conventional type of pump, it actuates piston rods 93 without acceleration and deceleration during travel. In other words, during operation of the pump the piston rods reciprocate at a constant speed throughout their limited path of travel. Thus the piston rods start their stroke at full speed and do not decelerate toward the end of the stroke but approach the end at full speed and then suddenly reverse, again commencing the return movement at full speed and maintaining such full speed through the entire reverse movement.

Referring to the right hand portion of Fig. 5, as the piston rods 93 move from right to left, a certain amount of pressure is created in chamber 79e which causes ball 90 (upper left) to rise, thus opening passageway 80e and enabling a small charge of water to pass upwardly through pipe 66e'. As this ball rises, ball 90 (lower left) falls and this falling movement closes the inlet line 82e, thus temporarily cutting off the supply of water to chamber 79e. While this is occurring at the left of the pump unit of Fig. 5, the opposite action is taking place at the right hand side so that a reduction in pressure occurs in chamber 79e', thus causing upper right ball 90 to fall and close the outlet passageway 80e' and causing lower right ball 90 to rise, closing the inlet passageway 81e' but opening line 82e' so that a charge of water can be received from the line 82e'. Now then, when the pistons 93 reverse an action occurs in the right hand chamber which is exactly like that of the left hand chamber just described, and by the same token during such period, which is very short, the left hand chamber undergoes the changes which have been described in connection with the right hand chamber. Thus, alternately, a small charge of water is caused to pass through the supply pipes 66e', 66e'' and 66e to whichever tank of the tank unit 60e, 61e is in operation at a given time. The air chamber 106 disposed at the juncture of lines 66e' and 66e'' maintains a constant flow of water during piston reversals. This air chamber is an inverted hollow metal cylinder closed at the top and open at the bottom and in which a small volume of air is trapped. The dotted line 107 indicates the normal level of water in the air chamber 106 and it will be clear that this level rises and falls somewhat during operation of the pump unit, thus insuring a constant, even, smooth flow of water to the particular tank which is receiving glaze. While only one pump and tank unit has been described in detail, the remaining seven are the same and hence need no detailed discussion.

In tank 108 (Fig. 7) a suitable supply of liquid glaze of proper specific gravity and viscosity is maintained. Leading from the bottom of this supply tank is a line 109 in which is interposed a magnetic separator indicated diagrammatically at 110 and which is a conventional device effecting removal of solid particles of iron from the liquid glaze as it passes through the separator. Line 109 may be provided with a suitable valve 111. Located above supply tank 108 is another tank 112 which ordinarily contains reclaimed glaze such as that recovered from the booths 24, 25, 34, 35 or at the wipers 59. This tank is provided with a discharge line 113 having a valve therein 114 so that the same can be fed to the supply tank 108 as and when desired.

One of the booths above referred to (booth 24 for example) is shown in Fig. 7 and is provided, as already described, with the four spray nozzles 26 fitting angularly thereinto associated with atomizing parts 27. The vertical belts 14 are shown passing through a tunnel 115 in the booth and certain pieces of the ware 12 are shown on the belts 14. Beneath the booth proper is a tapering chamber 116 in which the perforated baffles 117 are disposed as shown. At the smaller end of this chamber 116 a reduction chamber 118 is connected in communicating arrangement and mounted upon this reduction chamber is an electrical precipitation unit 119 of conventional design from the top of which an exhaust duct 120 leads to an exhaust fan 121 and thence to a stack 122, the exhaust fan being driven by the shaft 123 of the motor 124. Leading from and communicating with the chamber 116 below the booth is a pipe 125, valved at 126, adapted to discharge unused glaze into a tank or container 127. This container has an air inlet line 128 and a recovered glaze discharge line 129 which rises beside the two tanks 108 and 112 heretofore described, discharges into tank 112 and, optionally, directly into tank 108 through offtake 130 valved at 131. A valve 132 may be provided above tank 112.

Thus, during glazing operations, appreciable amounts of liquid glaze accumulate in the chamber 116 beneath each booth and this runs toward the lowermost portion thereof from which the same can be drained into the tank 127. By applying air pressure through air inlet line 128, glaze in tank 127 can be forced through the discharge line 129 and is ordinarily collected in the upper tank 112, although provision is made as explained for discharging reclaimed glaze directly into supply tank 108. The point of discharge depends upon the condition of the reclaimed glaze and other operating conditions as will be understood by those skilled in this art. The baffles 117 cause the air-glaze mixture to deposit most of its contained glaze for recovery, and the electrical precipitation unit collects solid particles thereon which may constitute an additional source of reclaimed glaze, the resulting gases or vapors being exhausted as indicated.

As will be understood from Figs. 8-10 inclusive, means is provided for guiding and controlling vertical belts 14. A pair of spaced flanged spindles 133 is mounted on a suitable base or support 134 and between spindles 133 is a third flanged spindle 135. It will be observed that spindles 133 are flanged at their upper and lower ends and that spindle 135 is flanged midway. The spindles are rotatively mounted on short vertical shafts 136. Vertical belts 14 pass between the spindles as is clearly shown in Fig. 10. The arrangement is such as to prevent belts 14 from becoming misaligned or otherwise maladjusted while at the same time maintaining smooth action thereof free from sagging, wobbling, jumping, etc., such as would interfere with effective glazing of the ware supported thereby. The vertical belts 14 are also thus maintained at the required spacing to accommodate the smaller tops of cups and the like which present a problem in prior conveyor systems.

In Fig. 11, pulley 17 is shown as being flanged at its upper and lower edges 17a and as being provided with recesses 17b underlying flanges 17a. Glaze on belts 14 not removed by wipers 59 will tend to collect in recesses 17b and thus enable the belts to be kept clean. The flanges of the pulleys 17 also maintain the belts 14 in proper position.

I will now describe the operation of the equipment referred to in order that the invention may be clear to those skilled in this art. As already indicated, a supply of liquid glaze of proper specific gravity and viscosity is maintained in tank 108. From this tank, as by means of flexible pipes or hoses, one battery of small tanks—either 60a–h or 61a–h—is filled with liquid glaze to the top, the dome-shaped covers having previously been removed. All valves in lines leading from this battery are assumed to be closed. This other battery is assumed to be in use in supplying glaze to the spray nozzles. Having filled the eight small tanks wtih glaze, the dome-shaped covers are now put in place and clamped tightly in position. Since these dome-shaped covers contain air, that is, air is trapped therein, it is necessary to fill the same with water to displace such air. To do this the valves or pet-cocks 70 on the covers are opened and the (referring now to the left hand tank 60e in Fig. 5) valve in line 74e is opened, thus enabling city water reduced in pressure by the needle valve 77 to enter the cover via inlet line 65e and, as already pointed out, this does not disturb the glaze already in the tank. Water is permitted to enter until it emerges from the valve or pet-cock 70, whereupon such is closed and then the valve in line 74e is closed. Then valves 65e'' and 62e' (of tank 60e) are opened and, the pump 67 being in operation, water is alternately forced from the pump unit through lines 66e' and 66e'', through line 66e and into tank 60e, valve 65e''', to the other tank (61e) of the unit having been previously closed. Valve 62e' of tank 60e is opened and as water thus enters tank 60e it forces glaze from the bottom of said tank through the lines 62e and 64e to the nozzle supply line 28 which communicates with two correspondingly disposed nozzles 26. Air is supplied from a suitable source through air supply line 32 to the aspirating portions 27 of the nozzles 26 so as to cause a projected mist of mixed air and glaze to be discharged from said nozzles onto the ware as shown at the upper portion of Fig. 5. Operation thus continues until the glaze level in tank 60e falls to approximately the dotted line B, and while the glaze level is dropping through this distance the other eight tanks as represented by the tank 61e of Fig. 5 are being filled in the same manner as already described in connection with the tank 60e, valves 62e' and 65e'' of tank 61e being closed at this time. Then the valve in line 74e of tank 61e is opened to fill the cover with water as already described, and then again closed, the same operations of valve 70 as above described being also effected. When the glaze level in tank 60e is approximately at B—and this is known by a revolution counter on the crankshaft of the pump—valves 65e'' and 62e' of tank 61e are opened. Thus at this stage glaze is being withdrawn from both tanks 60e and 61e, but this only occurs for a brief interval after which valve 62e' of tank 60e is closed so that glaze is no longer being withdrawn from the first tank 60e but is now being drawn entirely from the second tank 61e. Valve 65e'' of tank 60e is now closed. As glaze is being fed through the same line 64e as before, there is no interruption in the supply of glaze to nozzle supply line 28, nor is there any change in the pressure or rate of supply so that at all times a predetermined constant amount of glaze is being fed to the nozzles in question.

It will be understood without further discussion that a unit such as already described and shown in Fig. 5 is provided for each nozzle supply line feeding two nozzles, and hence description of one unit suffices for all. While liquid glaze is being withdrawn from tanks 61a–h, the tanks 60a–h are being refilled in the manner which will be understood from the foregoing. The residual glaze and supernatant water in each battery is drawn off therefrom to container 71 which may be of the same character already described in connection with container 127 of Fig. 7. Thus, glaze is supplied to the nozzles in a constant stream for glazing purposes so long as it is desired to carry out glazing operations.

Meanwhile, pre-heated ware has been fed onto feeding belt 13, and by means of the belts 14 and 33 and the actuating mechanism heretofore described (see Fig. 12), passes through booths 24 and 25 in inverted position and then through booths 34 and 35 in upright position so that both sides of the ware are coated with liquid glaze and every unit of area of the ware receives the same amount of glaze as every other unit of area, thus effecting the objects and advantages of the present invention.

A conveyor system such as that above described has a length of approximately 190' and the ware moves along the system at a speed of approximately 45' per minute; thus it requires only four and a fraction minutes to completely spray all surfaces of the ware with glaze. These figures show the adaptability of the present invention to mass production at low cost, but are not to be construed as limitations upon the invention since sizes, speeds, and the like may be varied materially depending upon conditions such as the capacities of the glaze equipment, the size of the ware, the temperature of preheating, and other factors which will be appreciated by those skilled in this art. After the ware is removed from the end of the conveyor system it may, as already indicated, be subjected to suitable finishing operations which per se form no part of the present invention.

Due to space limitations and for the purposes of avoiding undue complexity in the drawings, the nozzle supply lines have been illustrated only fragmentarily except in Fig. 4 which diagrammatically indicates the piping arrangement layout. The arrangement, as will be understood from Fig. 4, is such that glaze traveling from a feeding tank unit to a pair of nozzles traverses an equal length of piping to each such nozzle; i. e., the two nozzles of each pair are equidistant from the particular feeding tank unit supplying the same. The arrangement is also such that each pair of the four pairs of nozzles of booths 24 and 25 is equidistant from the corresponding four feeding tank units and the same is true of the pairs of nozzles of booths 34 and 35 except that the latter are uniformly more distant than the former.

As referred to above, I may optionally add heat to the ware during the conveying of the same on the vertical belts and an arrangement for accomplishing this is shown in Figs. 13 and 14. On each side of each belt 14 a burner is located which consists of a length of pipe 137 suitably connected to a supply of gas or other suitable fuel and perforated at 138. In this manner additional heat can be imparted to the ware to dry the glaze and is of particular value in connection with the glazing of vitrified ware which is substantially non-absorbent. One or more sets of burners may be used and suitably arranged with respect to booths 24 and 25. It will be noted that this arrangement avoids any considerable rise in temperature of belts 14 themselves. This feature I consider optional and hence I may use it or not depending upon the dictates of good judgment and practice according to the circumstances of any given operation or installation. One preferred location of this unit is between booths 25 and 34.

The foregoing is intended as illustrative or exemplary and not as restrictive or limitative and, within the principles herein set forth, I may make many variations, modifications, additions, or omissions to adapt the invention to any particular conditions encountered. Rather the invention is to be defined by the appended claims. Suitable gages 137 are, for example, provided on the pump 67, one gage to each unit. Since booths 34 and 35 are ordinarily at a greater distance from the pump than booths 24 and 25, those pump units operatively associated with booths 34 and 35 operate at a higher pressure. In one installation the gages on pump units for the nozzles in booths 24 and 25 showed a pressure of about 15 lbs. per sq. in. and the gages on pump units for the nozzles in booths 34 and 35 showed a pressure of about 35 lbs. per sq. in.

Having thus described my invention, what I claim as new and desire to secure by Letters Patent is:

1. Apparatus for spraying ceramic ware with liquid glaze which comprises a conveyor system, a plurality of spaced spray booths through which said conveyor system extends and through which said ceramic ware is adapted to be passed while on said conveyor system, atomizing nozzles disposed in said spray booths at an angle of about 45 degrees to the horizontal and each adapted to discharge glaze in a different direction, a plurality of feeding tanks connected to said nozzles, and a multi-unit constant displacement water pump connected to said feeding tanks, the said pump being constructed and arranged to deliver water to said feeding tanks at the rate and volume at which glaze is to be supplied to said nozzles.

2. Apparatus for spraying ceramic ware with liquid glaze which comprises a conveyor system, a plurality of spray booths associated with said conveyor system and through which said ceramic ware is adapted to be passed while on such conveyor system, atomizing nozzles disposed in said spray booths, a plurality of feeding tank units each of which is connected to a pair of said nozzles, said feeding tank units consisting of a plurality of functionally independent units and a constant displacement water pump having an equal number of units connected to said feeding tank units, whereby the liquid is supplied to the nozzles under the actuation and control of said pump.

3. Apparatus for spraying ceramic ware with liquid glaze which comprises a conveyor system, a plurality of spray booths through which said conveyor system extends and through which said ceramic ware is adapted to be passed while on such conveyor system, atomizing nozzles arranged in said spray booths in opposed pairs directed toward the conveyor system, a plurality of feeding tank units each connected to a pair of said nozzles, said feeding tank units consisting of a plurality of functionally independent pairs of tanks, a constant displacement water pump having a like number of units each of which is operatively connected to a tank unit, the construction and arrangement being such that said pump delivers water to said tank units and displaces glaze therefrom to a corresponding extent and said displaced glaze is delivered to said atomizing nozzles and thence deposited on the ware.

4. In an apparatus of the kind described, a plurality of functionally independent tank units, a constant displacement water pump connected to said tank units and having a number of functionally independent pumping units equal to the number of tank units, spray equipment for a glazing composition connected to said tank units, piping connections between said tank units and said spray equipment, piping connections between said tank units and said pumping units, said pump delivering a constant amount of water from said pumping units to said tank units through the piping aforesaid per unit of time, thus displacing a corresponding amount of glazing composition from said tank units and delivering the glazing composition so displaced to said spray equipment through the piping connecting the same.

5. Apparatus for spraying ceramic ware with liquid glaze which comprises a conveyor system, a plurality of spaced tunnel-like spray booths through which said conveyor system extends, a plurality of spray nozzles amounted in each such booth above the level of such conveyor system and aimed angularly downwardly in different directions, an atomizing nozzle mounted close to each spray nozzle, means for supplying liquid glaze at a constant rate and volume to such spray nozzles and means for supplying a compressed fluid to said atomizing nozzles, said first means including a plurality of containers for liquid glaze remote from such nozzles and a constant displacement water pump positioned adjacent said containers, supply pipes leading from said pump to said containers and supply pipes leading from said containers to said spray nozzles, the construction and arrangement being such that during operation of the pump water is fed to said containers at a constant rate and volume, thereby displacing liquid glaze from said containers at the same rate and volume and causing such glaze to be received by said nozzles and discharged therefrom in atomized condition.

6. Apparatus for spraying ceramic ware with liquid glaze which comprises a conveyor system, a plurality of spaced tunnel-like spray booths through which said conveyor system extends, a plurality of spray nozzles mounted in each such booth above the level of such conveyor system and aimed angularly downwardly in different directions, an atomizing nozzle mounted close to each spray nozzle, means for supplying liquid glaze at a constant rate and volume to such spray nozzles and means for supplying a compressed fluid to said atomizing nozzles, said first means including a plurality of containers for liquid glaze remote from such nozzles and a constant displacement water pump positioned adjacent said containers, supply pipes leading from said pump to said containers and supply pipes leading from said containers to said spray nozzles, the construction and arrangement being such that during operation of the pump water is fed to said containers at a constant rate and volume, thereby displacing liquid glaze from said containers at the same rate and volume and causing such glaze to be received by said nozzles and discharged therefrom in atomized condition, means for automatically depositing ceramic articles on one end of said conveyor system, thereby causing each such article to pass through each of the said spray booths, and means for preheating such ceramic articles to a temperature high enough to dry the sprayed articles relatively rapidly without developing bubbles and imperfections in the sprayed coating.

7. A method of spraying liquid glaze which comprises the steps of establishing a supply of liquid glaze, forcing water at a constant rate onto the upper surface of the said glaze supply to displace increments of glaze therefrom, leading the displaced increments of glaze to a plurality of discharge points and atomizing such increments of glaze at such discharge points.

8. A method of spraying liquid glaze which comprises the steps of establishing a supply of liquid glaze in the form of a columnar body, delivering water under pressure and at a constant rate onto the upper surface of the said columnar body of glaze to displace therefrom increments of glaze at the same rate as the delivery of water thereto, conducting the displaced increments of glaze from the bottom of said columnar body of glaze to a plurality of discharge points and atomizing the increments of glaze at such discharge points.

9. A method of spraying liquid glaze which comprises the steps of establishing a plurality of supply bodies of liquid glaze, delivering water at a constant rate onto the upper surface of each such supply body of glaze to displace therefrom increments of glaze at the same rate as said water is delivered thereto, conducting the displaced increments of glaze to a plurality of sets of discharge points in such manner that the displaced increments of glaze from each supply body of glaze are delivered to a corresponding discharge point in each set of discharge points and atomizing said glaze increments at their respective points of discharge.

10. Apparatus in accordance with claim 1 in which said conveyor system includes a pair of spaced vertical endless metal belts adapted to receive and support said ceramic ware on the upper edges of such belts with a minimum of contact between said ware and said belts and a pair of flat horizontal conveyor belts adjacent said vertical belts for delivering ware to said vertical belts and for removing it therefrom.

11. Apparatus as set forth in claim 1 in which the conveyor system is so constructed and arranged that the ware travels through said spaced spray booths on a pair of spaced thin vertical conveyor belts which make substantially only line contact with the ware.

12. Apparatus as defined in claim 1 in which the spray booths are arranged in two linear groups in the first of which the bottom of said ware is sprayed with liquid glaze and in the second of which the top of such ware is sprayed with liquid glaze, corresponding atomizing nozzles in each succeeding booth of each group of booths being arranged to discharge liquid glaze onto corresponding ware surfaces in the same total amount per unit of ware surface.

JAMES A. BOWER.

CERTIFICATE OF CORRECTION.

Patent No. 2,295,928.  September 15, 1942.

JAMES A. BOWER.

It is hereby certified that error appears in the printed specification of the above numbered patent requiring correction as follows: Page 7, first column, line 72, claim 3, strike out "operatively"; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.